United States Patent
Fuerderer

(10) Patent No.: US 10,940,558 B2
(45) Date of Patent: Mar. 9, 2021

(54) ELECTRODE FOR RESISTANCE WELDING

(71) Applicant: DOCERAM GMBH, Dortmund (DE)

(72) Inventor: Tobias Fuerderer, Unna (DE)

(73) Assignee: DOCERAM GMBH, Dortmund (DE)

(*) Notice: Subject to any disclaimer, the term of this patent is extended or adjusted under 35 U.S.C. 154(b) by 216 days.

(21) Appl. No.: 15/996,415

(22) Filed: Jun. 1, 2018

(65) Prior Publication Data

US 2018/0339359 A1     Nov. 29, 2018

(30) Foreign Application Priority Data

May 29, 2017 (DE) .................. 10 2017 111 633.8

(51) Int. Cl.
| | |
|---|---|
| *B23K 11/30* | (2006.01) |
| *B23K 11/36* | (2006.01) |
| *B23K 11/14* | (2006.01) |
| *B23K 11/00* | (2006.01) |

(52) U.S. Cl.
CPC ...... *B23K 11/3009* (2013.01); *B23K 11/0053* (2013.01); *B23K 11/14* (2013.01); *B23K 11/36* (2013.01)

(58) Field of Classification Search
CPC ..... B23K 11/3009; B23K 11/14; B23K 11/30; B23K 11/36; B23K 11/0053
See application file for complete search history.

(56) References Cited

U.S. PATENT DOCUMENTS

| | | |
|---|---|---|
| 5,285,044 A | 2/1994 | Aoyama |
| 6,008,463 A | 12/1999 | Aoyama |

FOREIGN PATENT DOCUMENTS

| | | | | |
|---|---|---|---|---|
| CN | 204771113 U | * | 11/2015 | |
| DE | 933045 B | | 10/1955 | |
| DE | 935075 B | | 10/1955 | |
| DE | 69116077 T2 | * | 9/1996 | ......... B23K 11/0053 |
| DE | 69216077 T2 | | 9/1996 | |
| DE | 69216077 T2 | | 9/1996 | |
| DE | 69733783 T2 | | 4/2006 | |
| JP | H02 235584 A | | 9/1990 | |
| JP | 2016203250 A | * | 12/2016 | |
| JP | 20176982 A | | 1/2017 | |
| JP | 2017006982 | | 1/2017 | |
| JP | 2017136638 A | | 8/2017 | |

OTHER PUBLICATIONS

Machine translation of China Patent No. 204771113-U, Apr. 2020.*
German Search Report, dated Feb. 27, 2018, pp. 3 et seq.
European Patent Office Search Report, dated Oct. 30, 2018.

* cited by examiner

*Primary Examiner* — Geoffrey S Evans

(74) *Attorney, Agent, or Firm* — Wuersch & Gering LLP

(57) ABSTRACT

An electrode is provided for the resistance welding of bolts, having an upper part and a lower part which are configured to be connectable together and, in the connected state, jointly provide a cavity, the upper part having an opening for introducing a bolt, and the lower part having a gas connection for a pressurized gas. A valve body, by way of which the opening is closable, is arranged in the cavity. As a result, applied compressed air is prevented from flowing out. Compressed air only emerges when the valve body opens up the opening.

24 Claims, 3 Drawing Sheets

ELECTRODE FOR RESISTANCE WELDING

CROSS-REFERENCE TO RELATED APPLICATIONS

This application claims priority to German Patent Application No. 10 2017 111 633.8, entitled "Elektrode and Verfahren zum Widerstandsschweissen", filed on May 29, 2017, and incorporated herein in its entirety.

FIELD OF INVENTION

The present invention relates to an electrode for the resistance welding of bolts, having an upper part and a lower part which are configured to be connectable together and, in the connected state, jointly provide a cavity, the upper part having an opening for introducing a bolt, and the lower part having a gas connection for a pressurized gas.

RELATED INFORMATION

Methods for the resistance welding of bolts to a metal sheet are well known from the prior art. For example, an electrode is used which provides a cavity and an access in the form of an opening for the bolt. A typical bolt has a head and a shank. The head serves to butt against the metal sheet. It is welded to the metal sheet. The shank can be configured in a smooth manner or have an external thread or an internal thread.

In order to weld the bolt to the metal sheet, resistance welding can be used. For example, the metal sheet is placed on the upper part of the electrode. The bolt is plugged with its shank through a bore in the metal sheet and partially received in the electrode. Subsequently, an upper electrode pushes the bolt further into the electrode, specifically until the head of the bolt butts against the metal sheet. In the process, an electrical connection is established between the upper electrode, the bolt, the metal sheet, and the electrode. On account of the voltage drop between the bolt head and the metal sheet, a large amount of heat is generated, which effects the welding of the bolt to the metal sheet.

Resistance welding has proven successful in principle in particular in the automotive industry, but also in other branches of industry. However, it is possible for residues of the material melted during the welding operation to result in contamination of the electrodes. Therefore, regular cleaning of the electrodes is necessary. If this does not occur, the performance of the electrode decreases gradually, resulting in considerable losses of quality with regard to the welded connection.

In order to overcome this drawback, it is known from the prior art to provide the electrode with a compressed-air connection. Via the compressed-air connection, compressed air is introduced into the electrode during the welding operation and fed to the welding point. Molten material is entrained by the airflow and removed from the electrode and the welding point.

Two methods are known from practice in connection with application of compressed air. In the first method, continuous introduction of compressed air takes place even when welding is not being carried out. This has the drawback that compressed air is wasted, making the method not very economical. Moreover, it is possible, on account of the ongoing escape of compressed air, for the bolt to be blown out of the electrode before the welding operation. Correct and error-free positioning of the bolt is then not possible.

In a second method, the application of compressed air is controlled by control electronics. The control electronics ensure synchronization between the pushing down of the upper electrode to initiate the welding operation and the introduction of the compressed air. However, the control electronics are complicated and expensive, and the maintenance effort is high.

SUMMARY

In order to overcome the above-described drawbacks of previous systems, embodiments of the present invention are directed to creating an electrode and a method in which molten material can be removed easily and effectively from the welding region.

In embodiments of the present invention, a valve body, by way of which the opening is closable in terms of flow, is arranged in the cavity. In embodiments of the present invention, an opening of the valve body can be closed directly or indirectly.

In an embodiment, with gas pressure applied, the valve body is in a closed valve position. In this case, the gas introduced into the cavity of the electrode cannot escape through the opening in the upper part of the electrode. Only by the action of the bolt is the valve body moved into an open valve position. When the bolt is removed, the valve body is automatically moved back into its closed valve position again by the applied gas pressure. As a result, gas for removing molten material is fed to the welding point only during the actual welding operation. Otherwise, the gas feed is interrupted by the valve body.

In an embodiment, the opening can be closed in terms of flow by the valve body. In terms of flow means in this connection that the opening can be closed directly or indirectly by the valve body. In the case of direct closing, the valve body directly covers the opening. In the case of indirect closing of the opening, the valve body does not directly close the opening. This means that the flow path of the gas through the opening is interrupted by the valve body without the valve body having to directly close the opening.

As a result, in an embodiment, the gas consumption can be reduced considerably compared with earlier systems. Furthermore, the electrode according to the present invention is not dependent on the use of complicated control electronics. Rather, these can be dispensed with entirely.

In an embodiment of the present invention, the valve body is configured as a three-dimensional shaped body. In an embodiment, the valve body is made of a comparatively hard and impact-resistant material. In an embodiment, the valve body is made of steel. In an embodiment, the valve body is shaped such that it is movable in the interior of the cavity. In an embodiment, the valve body is in the form of a ball. This prevents the valve body from tilting in the cavity. In an embodiment, the valve body as a steel ball ensures that the valve body retains its advantageous shape even over a long service life.

In an embodiment, bolts that are usable include those made of an electrically conductive material, for example, metal. They have a bolt head and a bolt shank that adjoins the latter. The bolt shank can be cylindrical. The bolt shank can have a thread. This thread can be either an internal thread or an external thread. Bolts having a thread in this case can include, for example, the product class of screws. The electrode according to the present invention is suitable for all types of bolts. It is used predominantly in the resistance welding of screws onto metal sheets.

In an embodiment, the lower part of the electrode has a gas connection for introducing a pressurized gas. In an embodiment, the gas is compressed air. Compressed air has the advantage that it is comparatively inert and available in large quantities. Alternatively, the gas connection can also serve for the introduction of an inert gas. In particular when high-alloy steels are welded, the use of inert gas is advantageous. The latter can include for example nitrogen and/or argon.

In an embodiment, the upper part and the lower part of the electrode are configured in a connectable manner and, in the connected state, provide a joint cavity. In this case, the two parts are made of an electrically conductive material, in particular of copper or a copper alloy. The copper or copper alloy provides good electrical and thermal conductivity, this is advantageous for the welding process.

Advantageously, in an embodiment, the upper part and the lower part each have connecting means on their mutually facing sides. The connection between the upper part and lower part is configured, for example, in a releasable manner.

In an embodiment, provision is made, for example, for the upper part of the electrode to be able to be connected to the lower part in a replaceable manner. During the welding operation, the metal sheet rests on the upper part of the electrode. The upper part is therefore subject to particular loading and tends to wear. Therefore, it is advantageous for the upper part of the electrode to be able to be replaced independently of the less loaded lower part. In this regard, the upper part is also referred to as an exchangeable electrode.

In an embodiment, the connecting means are configured or made as a screwing means. Then, the upper part and the lower part are, for example, in threaded engagement with one another. The threaded engagement allows a stable connection of the upper and lower parts.

Alternatively, in an embodiment, the connection between the two parts is configured or made as a bayonet joint. Such a joint is constructible with simple means, in a variety of available ways known by one of ordinary skill in the art, and uncomplicated to handle.

In an embodiment, the upper part and/or the lower part is/are configured at least regionally with a polygonal, for example, hexagonal, contour. As a result, the upper part can be fastened and released with conventional tools, such as a wrench, for example.

In an embodiment, the valve body is arranged in the cavity. This has the advantage that it is possible to regulate the gas flow by way of simple means directly in the electrode. In an embodiment, provision is made for the valve body to be guided in the cavity. This reduces the possibilities for the valve body to move within the cavity and consequently results in quicker switching from the closed valve position to the open valve position and vice versa.

In an embodiment, the valve body is guided in this case without mechanical preloading. The valve body is kept in its closed position exclusively by the applied gas pressure. As a result, it is advantageously possible to dispense with additional mechanical elements, such as in particular spring elements. This results in a construction with few parts, which is operable with very low maintenance.

In an embodiment, a flow path for the introduced gas is defined in the interior of the electrode. The flow path extends from the gas connection in the lower part of the electrode, via the cavity, to the opening in the upper part of the electrode. The flow path serves according to the invention to feed the pressurized gas to the opening and to blow away excess molten material and possibly scale during the welding operation. In an embodiment, the valve body is arranged in the flow path in this case. As a result, the valve body can be held in its closed position solely by the applied gas pressure. In this position, the valve body closes the opening in the upper part, for example, in a gastight manner.

In an embodiment, it is considered to be particularly advantageous for an insulating sleeve to be arranged in the cavity. The insulating sleeve is made of, for example, an electrically insulating material. The insulating sleeve can serve to prevent electrical contact between the electrode and the bolt penetrating into the cavity during the welding operation. Otherwise, there would be a risk of a short circuit between the bolt and the electrode.

In an embodiment, the insulating sleeve serves to guide the valve body. Here, the flow path extends, for example, through the insulating sleeve. In order to guide the valve body, the insulating sleeve, for example, has an internal guide portion. The guide portion has, for example, a cylindrical cross section. As a result, the valve body can be guided particularly advantageously. This applies especially when the valve body embodiment is a ball.

In an embodiment, the guide portion is arranged in the lower part of the electrode. As a result, when used as intended, the free end of the bolt shank can already be introduced into the interior of the upper part of the electrode before the welding operation is initiated. This region is flow-free in the closed state of the valve. The problem, known from the prior art, of the bolt being blown out of the electrode during preparation is prevented with the invention. In this regard, it is considered advantageous for the insulating sleeve to form a valve seat which is arranged at a distance from the opening (that is in the upper part). The valve seat cooperates with the valve body.

In an embodiment, the insulating sleeve forms a sleeve opening which has a reduced inside diameter compared with the guide portion. In the guide portion, the valve body is guided. Since the sleeve opening has a smaller inside diameter, the valve body can close the sleeve opening. The valve body guided in the guide portion is pushed toward the sleeve opening in the direction of flow under applied gas pressure and closes said opening in terms of flow. To this end, in an embodiment, the gas connection is arranged upstream of the sleeve in the direction of flow.

In an embodiment, the opening in the upper part of the electrode and the sleeve opening are aligned. It is advantageous for the opening in the upper part and the sleeve opening to be oriented coaxially with one another. In this case, the free end of the bolt shank is guided onto the valve body in a straight direction. Advantageously, in an embodiment, pushing of the bolt down through the upper electrode simultaneously results in the valve body moving. As a result, the moving of the bolt, which is necessary in any case, is used in a simple and synergistic manner to free up the sleeve opening and thus also the opening in the upper part. Additional mechanisms are not required.

In an embodiment, in order to form the sleeve opening, the insulating sleeve provides an encircling collar on the inside. In an embodiment, the collar is formed in an entirely encircling manner and narrows expediently toward the inside. In its closed position, the valve body cooperates with the collar. When used as intended, the valve body, in particular the steel ball, is pushed against the collar by the applied gas pressure and as a result closes the sleeve opening. In an embodiment, the collar has a beveled stop surface. In an embodiment, the stop surface narrows in the direction of the opening in the upper part. In an embodiment, it is advantageously formed in a conical manner. As a result, in an embodiment, advantageous sealing is created in particular for a spherical valve body.

In an embodiment, the insulating sleeve is made of a plastic. The insulating sleeve can be made for example of polypropylene (PP) or acrylonitrile-butadiene-styrene (ABS). Other plastics or comparable materials are also possible. In an embodiment, a fiber-reinforced plastic (composite) is particularly advantageous. The advantage of a plastic or comparable material is that, in combination with a hard valve body, in particular a valve body made of metal or ceramic, good sealing can be achieved.

In an embodiment, the electrode has a guide element for guiding the bolt in the electrode. The guide element serves to receive the bolt (or the shank thereof) and, in particular during welding, to prevent contact between the bolt and the electrode in order to avoid a short circuit. In an embodiment, the guide element is arranged in the cavity of the electrode. The flow path extends advantageously through the guide element. To this end, in an embodiment, the guide element has a cylindrical passage. In an embodiment, in order to provide a linear guide path in the cavity, the passage is aligned with the opening in the upper part of the electrode and with the sleeve opening. As a result, when it has been introduced into the electrode, the bolt can be supported on the valve body. This allows prior introduction into the electrode, with the bolt remaining within the guide element. Any holding and/or gripping devices are obsolete.

According to a first configuration, in an embodiment, the guide element can be provided by the insulating sleeve. Here, in an embodiment, the guide element is formed integrally with the insulating sleeve. The guide element is in this case formed by that part of the insulating sleeve that adjoins the sleeve opening in the direction of flow. It is thus arranged between the sleeve opening and the opening in the upper part of the electrode. Such a component can be produced easily and in a manner suitable for mass production, and is inexpensive to manufacture.

Alternatively, in an embodiment, the guide element is configured as a separate component. Such a configuration has a number of advantages. Thus, it is possible for the insulating sleeve and the guide element to be made of different materials, as is considered advantageous. Thus, the guide element can be equipped with particular properties. In an embodiment, the guide element is made of a ceramic material. These materials are corrosion-, abrasive-, and temperature-resistant. Furthermore, a ceramic sleeve is not electrically conductive.

Located directly at the opening in the upper part of the electrode, upon use as intended, is the welding point. As a result, the guide element is exposed to very high temperatures and the corrosive effects of the welding. Furthermore, the inner walls, defining the passage, of the guide element are exposed to comparatively high mechanical loading by the bolts guided therein. In an embodiment, screws are challenging in this regard, since the external thread causes particularly significant wear. In an embodiment, use of a ceramic material affords significant advantages compared with a configuration made of plastic. Suitable ceramic materials include high-performance ceramics. These afford particularly advantageous properties with regard to thermal resistance and wear resistance. For example, such can be alumina-, zirconia-, titania-, or silica-based ceramics. Mixed ceramics made of alumina and zirconia, in particular in the form of ATZ (alumina toughened zirconia) or ZTA (zirconia toughened alumina), are also usable. Also usable are silicon nitride ceramics ($Si_3N_4$) or Y-PSZ ceramics (yttrium partially stabilized zirconia). It has been found that these ceramics are suitable for the required demands in terms of temperature-, abrasion-, and corrosion-resistance, and of electrical insulation.

Against this, in an embodiment, it is considered advantageous for the guide element to be configured or made as a ceramic sleeve. Said sleeve is supported here directly on the insulating sleeve. As a result, the guide element is kept in position by the insulating sleeve. Moreover, the guide element reinforces the sleeve opening, for example, the encircling collar with respect to the force applied by the valve body. This is advantageous, for example, when the guide element is made of ceramic. In this regard, there is a positive effect when the insulating sleeve consists of plastic and the guide element is made of ceramic.

In an embodiment, the inside diameter of the passage is at most as large as the inside diameter of the sleeve opening. As a result, the insulating sleeve is protected, this is advantageous, for example, when the insulating sleeve is formed from a softer material. The collar can in this regard be made of a comparatively soft material, which has an excellent sealing action. The necessary mechanical stability is provided by the guide element.

Alternatively or additionally, in an embodiment, the inside diameter of the passage is smaller than the opening in the upper part. The bolt is then advantageously guided exclusively by the guide element. As a result, the shank of the bolt does not come into contact with the electrode (which would cause a short circuit). Moreover, the guide element can be formed from a wear-resistant material, such as ceramic, for example, such that a long-lasting structure is created overall.

In an embodiment, a method for the resistance welding of bolts to a metal sheet can be realized, wherein the bolt is introduced into an electrode through the metal sheet in a first direction of movement, and wherein, during the welding operation, a pressurized gas escapes from the electrode counter to the first direction of movement.

In an embodiment, in an advantageous configuration of the method, a valve within the electrode is opened by means of the bolt, the gas escaping from the electrode through said valve.

In an embodiment, when the electrode is used as intended, a pressurized gas is introduced into the cavity of the electrode. Within the electrode, a flow path is defined in this case. The latter extends from the gas connection in the lower part of the electrode, via the joint cavity, to the opening in the upper part of the electrode. The flow path is interrupted by the valve body arranged in the cavity, provided that a bolt is not received in the electrode. In an embodiment, the valve is configured such that the valve body is kept in a closed valve position by the applied gas pressure. If the free end of the bolt shank is pushed into the cavity for welding, contact between the bolt and valve body is established. The valve body is moved into an open valve position by means of the bolt. As a result, gas for removing molten material and possibly scale is fed to the welding point only during the actual welding operation. Otherwise, the gas feed is interrupted by the valve body. As a result of the configuration, the gas consumption is considerably reduced compared with configurations known from the prior art. Furthermore, the configuration according to the invention is not dependent on the use of complicated control electronics. Rather, the latter can be dispensed with entirely.

In an embodiment of a method feature, in order to open the flow path, the valve body is displaced in a first direction of movement by the free end of the bolt shank. The first direction of movement is in this case in the opposite direction to the direction of flow of the emerging gas. Taking the applied gas pressure into account, the valve according to the invention is thus designed as a nonreturn valve. If, following completion of the welding operation, the bolt is removed from the electrode again, the valve body, driven by the applied gas pressure, returns into its closed position again. The valve is thus kept closed by the pressurized gas, provided that there is no bolt acting on the valve.

In an embodiment, a gas escapes from the electrode. The gas is introduced into the interior of the electrode from the lower part of the electrode. In an embodiment, compressed air is introduced. Compressed air has the advantage that it is not excessively reactive and can be obtained relatively inexpensively in large quantities. Alternatively, in an embodiment, a pressurized inert gas is introduced into the electrode. In particular when high-alloy steels are welded, the use of inert gas is advantageous. In an embodiment, the inert gas is nitrogen or argon. In an embodiment, the gas pressure in the interior of the electrode in the closed state of the valve is between 1 bar and 30 bar, preferably between 1 bar and 8 bar, particularly preferably between 1 bar and 3 bar. This has proven to be particularly advantageous in connection with the valve body used according to the invention. As a result, the desired cleaning performance can be achieved. In addition, the required force is adapted in this region to the technical conditions of the upper electrode for actuating the valve.

In an embodiment, the bolt is brought into contact with the valve body with its free end. As a result, it is possible to dispense, in device terms, with holding and/or gripping elements at the upper electrode.

In an embodiment, following completion of the welding operation, the bolt is removed from the electrode. In the process, in an embodiment, the open flow path is closed by means of the valve as a result of the applied gas pressure. This ensures that no gas is wasted after the welding operation, too.

BRIEF DESCRIPTION OF THE DRAWINGS

The invention is explained in more detail in the following text by way of an exemplary embodiments in conjunction with the appended drawing, in which.

DETAILED DESCRIPTION

It should be noted that in the following description of the figures, components with the same or similar functions are provided with the same reference signs for clarity reasons, even when they differ from one another in terms of detail. Location terms such as "top", "bottom", "lateral" or "rear", for example, refer to an upright electrode 1, as is used in resistance welding and as is depicted.

Figure 1:
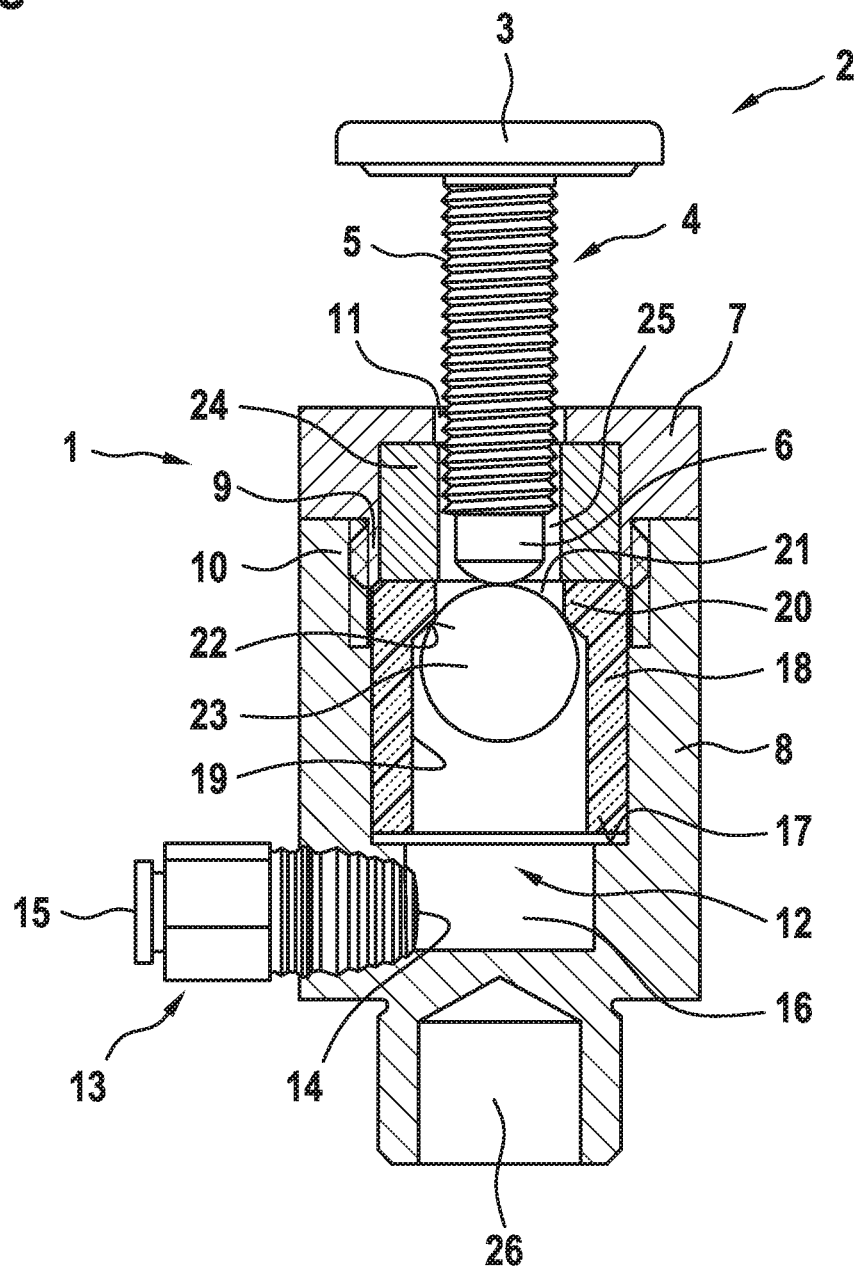
FIG. 1 shows a schematic sectional illustration of an electrode according to the invention with the valve closed.

FIG. 1 shows a schematic sectional illustration of an exemplary embodiment of the electrode 1 according to the invention. An electrode 1 and a bolt 2 are shown. The bolt 2 is configured in the present case as a screw. It has a screw head 3 and a screw shank 4, which directly adjoins the screw head 3.

The screw shank 4 has a thread 5. The thread 5 is configured as an external thread. Furthermore, the screw shank 4 has a free end 6. The free end 6 is configured in a conically tapering manner at the end. The screw consists in the present case of metal, in particular of steel.

The electrode 1 has an upper part 7 and a lower part 8. Both parts consist of copper or a copper alloy. The upper part 7 and the lower part 8 are configured to be connectable together. To this end, they each have a fastening portion 9, 10. The fastening portion 9 of the upper part 7 has an external thread. The fastening portion 10 of the lower part 8 has a corresponding internal thread. In an embodiment, the upper part 7 and the lower part 8 are able to be screwed together. As a result, the two parts 7, 8 are releasable from one another and can be replaced if necessary.

In its top side, the upper part 7 has a central opening 11. The opening 11 affords access to a cavity 12, formed between the upper part 7 and the lower part 8, for the bolt 2. In an embodiment, the cross section of the cavity 12 is formed in a cylindrical manner.

On its left-hand side, the lower part 8 provides a compressed-air connection 13. The compressed-air connection 13 has an air outlet 14 and an air inlet 15. The air outlet 14 projects here into a lower, free portion 16 of the cavity 12. A flow path is defined in the interior of the electrode 1 from the compressed-air connection 13, via the cavity 12, to the opening 11. On this path, the compressed air is fed through the opening 11 to the welding point, which is illustrated in detail in FIG. 3.

The cross section of the free portion 16 has a smaller inside diameter than the rest of the cavity 12. As a result, the portion 16 forms an abutment surface 17 which serves for example to support an insulating sleeve 18. The latter is arranged in that part of the cavity 12 that is provided by the lower part 8. The insulating sleeve has a guide portion 19 and an encircling collar 20. The encircling collar 20 defines a sleeve opening 21. The sleeve opening 21 has a smaller inside diameter than the guide portion 19. The collar 20 has an encircling, conically tapering stop surface 22. The insulating sleeve 18 is made in the present case of a plastic, for example of polypropylene.

With its guide portion 19, the insulating sleeve 18 accommodates a valve body. The valve body is configured in the present case, for example, as a steel ball 23. In an embodiment, it is accommodated in the insulating sleeve. The steel ball 23 and the insulating sleeve 18 advantageously form a valve in the interior of the electrode 1. In FIG. 1, the electrode 1 is illustrated in a closed state of the valve. In this case, the compressed air is passed along the flow path into the electrode 1. As a result of the applied air pressure, the steel ball 23 is pushed against the stop surface 22 of the collar 20 and thus closes the sleeve opening 21. The diameter of the steel ball 23 is such that it cannot pass through the sleeve opening 21. As a result, the flow path in the interior of the electrode is interrupted. In the closed state of the valve, compressed air cannot emerge from the sleeve opening 21, and thus cannot emerge from the opening 11 either.

Arranged above the insulating sleeve 18 is a guide element in the form of a ceramic sleeve 24. The ceramic sleeve 24 serves to guide the screw 2. The primary purpose thereof is to prevent contact between the screw shank 4 and the inner wall of the upper part 7 of the electrode 1. To this end, the ceramic sleeve provides a passage 25 which is advantageously aligned with the sleeve opening 21 and the opening 11 in the upper part 7. A linear guide for the screw 2 is thus created, which allows contact between the free end 6 of the screw shank 4 and the steel ball 23. Furthermore, the inside diameter of the passage 25 is configured to be smaller than the inside diameter of the opening 11 in the upper part. As a result, contact between the electrode 1 and the screw 2 is also prevented in the region of the opening 11. In the illustrated closed state of the valve, the screw 2 can be plugged into the passage 25 in the ceramic sleeve 24 in order to prepare for the welding operation. The free end 6 rests in this state on the steel ball 23, without displacing it. This state is illustrated in FIG. 1.

The lower part 8 of the electrode 1 also has a fastening device 26 on its underside. The fastening device 26 serves to arrange the electrode on a mounting device (not shown). Via the device, the electrode 1 is attached to an electric circuit.

Figure 2:
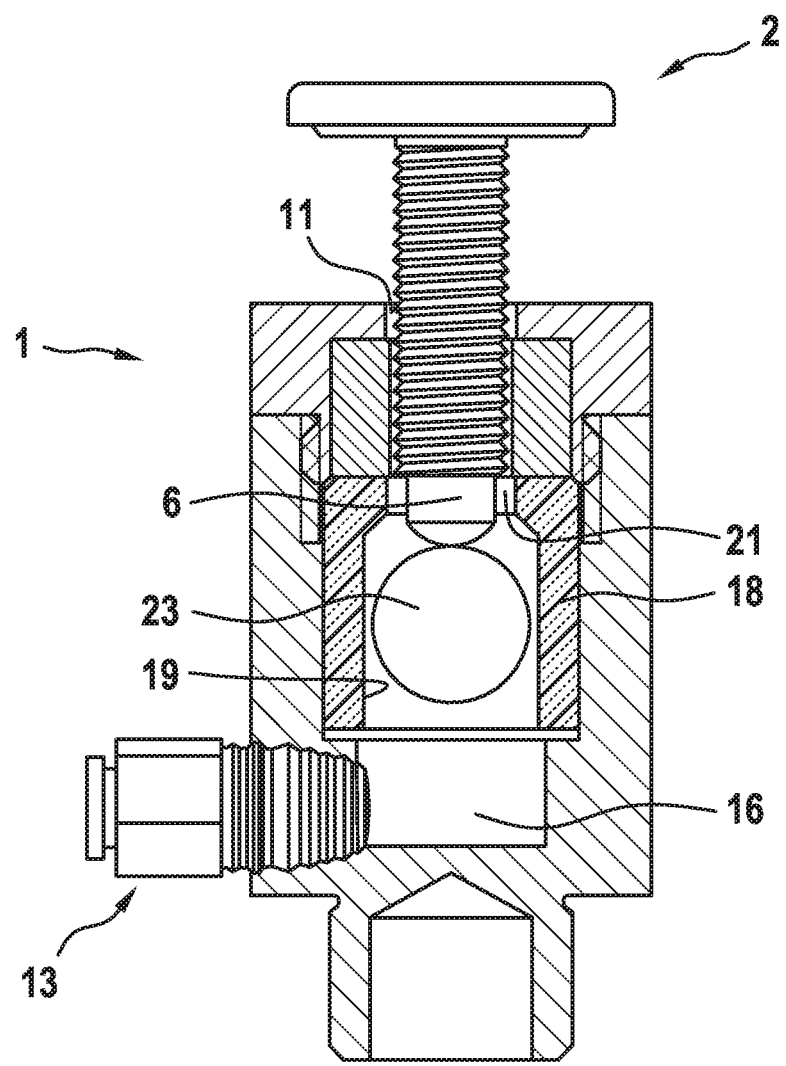
FIG. 2 shows a schematic sectional illustration of an electrode according to the invention with the valve open.

FIG. 2 shows the electrode 1 according to FIG. 1 in the open state of the valve. The screw 2 has been pushed further into the electrode 1 through the opening 11. In the process, the free end 6 of the screw shank 4 pushes the steel ball 23 out of its closed position along the guide portion 19 counter to the direction of flow of the compressed air. The compressed air can now flow from the compressed-air connection 13, through the free portion 16, into the insulating sleeve 18, past the steel ball 23 therein, through the sleeve opening 21, onward through the passage 25, and out of the opening 11 to the welding point illustrated in FIG. 3. In order that the compressed air can pass the steel ball 23, the valve body and the guide portion generally form an air gap through which the compressed air can flow.

Figure 3:
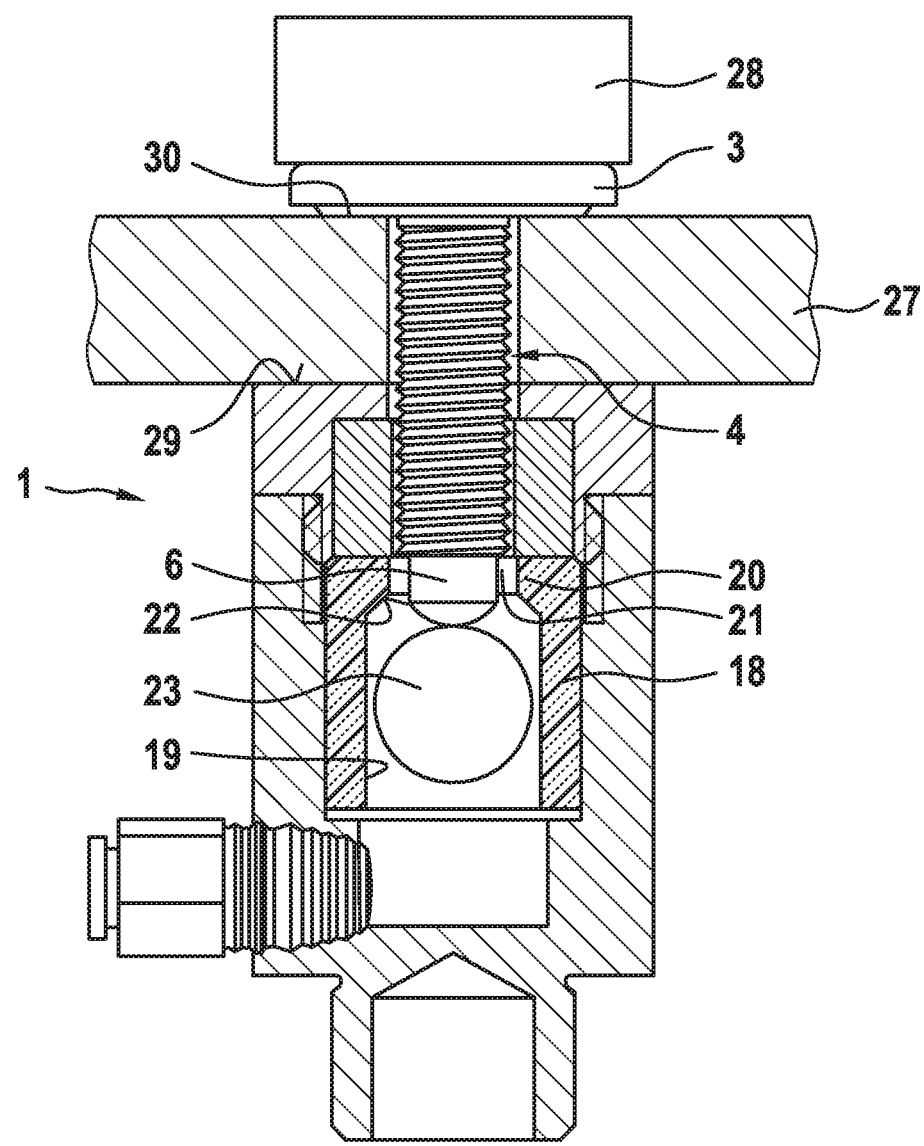
FIG. 3 shows an electrode according to the invention shown in FIG. 2, with the upper electrode and metal sheet.

FIG. 3 shows the electrode according to FIG. 2 in the open state of the valve. Also shown are the metal sheet 27 to which the bolt 2 is intended to be welded, and also a (highly schematic) upper electrode 28. For illustrative purposes, the metal sheet 27 is illustrated somewhat thicker in FIG. 3 than it is in reality.

The screw shank 4 has been plugged through a bore in the metal sheet 27. The metal sheet 27 limits the plug-in depth of the bolt, which comes to butt against the metal sheet 27 with its screw head 3 in the plug-in direction.

In order to fasten the bolt 2, configured as a screw, to the metal sheet 27 by means of resistance welding, the screw shank 4 is introduced through the metal sheet 27 into the passage 25 in the ceramic sleeve 24, until the free end 6 of the screw shank comes into contact with the steel ball 23. Then, the bolt is pushed further into the electrode 1 through the upper electrode 28 until the screw head 3 rests on the metal sheet 27 and the metal sheet 27 rests in contact with the electrode surface 29. As a result, the circuit between the electrode 1 and upper electrode 28 is closed, with the result that the bolt 2 and the metal sheet 27 are welded together. At the same time, the bolt 2 pushes against the steel ball 23 with its free end 6 and moves it counter to the direction of flow of the compressed air within the guide portion 19. As a result, the valve is opened and compressed air can flow past the steel ball 23 through the sleeve opening 21. The compressed air is fed to the welding point 30. Excess molten material and scale are flung away by the compressed air.

Following completion of the welding operation, the upper electrode 28 is pulled upward and the metal sheet 27 with the welded bolt is lifted off the electrode. The steel ball 23 is pressed against the stop surface 22 of the encircling collar 20 by the compressed air and as a result closes the sleeve opening 21 in an airtight manner.

In an embodiment, an electrode for the resistance welding of bolts (2), having an upper part (7) and a lower part (8), which are configured to be connectable together and, in the connected state, jointly provide a cavity (12), the upper part (7) having an opening (11) for introducing a bolt (2), and the lower part (8) having a gas connection (13) for a pressurized gas, wherein a valve body (23), by way of which the opening (11) is closable in terms of flow, is arranged in the cavity (12). An electrode for the resistance welding of bolts, comprising: an upper part and a lower part, which are configured to be connectable together and, in the connected state, jointly provide a cavity; the upper part having an opening for introducing a bolt, and the lower part having a gas connection for a pressurized gas, wherein a valve body, the opening being at least one of closable directly and closable indirectly by the valve body, is arranged in the cavity.

The electrode as described in combination with one or more of the aforementioned embodiments, wherein the valve body (23) is guided in the cavity (12). The electrode as described in combination with one or more of the aforementioned embodiments, wherein the valve body (23) is guided in the cavity (12) without mechanical preloading. The electrode as described in combination with one or more of the aforementioned embodiments, wherein the valve body (23) is a ball. The electrode as described in combination with one or more of the aforementioned embodiments, wherein the ball is made of metal. The electrode as described in combination with one or more of the aforementioned embodiments, wherein the gas connection (13) and the opening (11) define a flow path, and wherein the valve body (23) is arranged in the flow path. The electrode as described in combination with one or more of the aforementioned embodiments, wherein an insulating sleeve (18) is arranged in the cavity (12). The electrode as described in combination with one or more of the aforementioned embodiments, wherein the insulating sleeve (18) is made of plastic. The electrode as described in combination with one or more of the aforementioned embodiments, wherein the insulating sleeve (18) has an internal preferably cylindrical guide portion (19). The electrode as described in combination with one or more of the aforementioned embodiments, wherein the insulating sleeve (18) forms a sleeve opening (21) which has a reduced inside diameter compared with the guide portion (19). The electrode as described in combination with one or more of the aforementioned embodiments, wherein the sleeve opening (21) and the opening (11) in the upper part are arranged coaxially. The electrode as described in combination with one or more of the aforementioned embodiments, wherein the insulating sleeve (18) provides an encircling collar (20) on the inside, which cooperates with the valve body (23). The electrode as described in combination with one or more of the aforementioned embodiments, wherein the collar (20) has a beveled stop surface (22). The electrode as described in combination with one or more of the aforementioned embodiments, wherein the valve body (23) is accommodated in the insulating sleeve (18). The electrode as described in combination with one or more of the aforementioned embodiments, wherein the flow path passes through the insulating sleeve (18). The electrode as described in combination with one or more of the aforementioned embodiments, wherein a guide element (24) for receiving the bolt (2) is accommodated in the upper part (7) of the electrode (1). The electrode as described in combination with one or more of the aforementioned embodiments, wherein the guide element (24) has a preferably cylindrical passage (25) which is aligned with the opening (11) in the upper part and the sleeve opening (21). The electrode as described in combination with one or more of the aforementioned embodiments, wherein the inside diameter of the passage (25) is smaller than the opening (11) in the upper part. The electrode as described in combination with one or more of the aforementioned embodiments, wherein the guide element (24) is a ceramic sleeve.

What is claimed is:

1. An electrode for the resistance welding of bolts, comprising:
   an upper part and a lower part, which are configured to be connectable together and, in the connected state, jointly provide a cavity;
   the upper part having an opening for introducing a bolt, and the lower part having a gas connection for a pressurized gas,
   wherein
   a valve body, by way of which the opening is closable in terms of flow, is arranged in the cavity.

2. The electrode of claim 1, wherein the valve body is guided in the cavity.

3. The electrode of claim 1, wherein the valve body is guided in the cavity without mechanical preloading.

4. The electrode of claim 3, wherein the gas connection and the opening define a flow path, and wherein the valve body is arranged in the flow path.

5. The electrode of claim 1, wherein the valve body is a ball.

6. The electrode of claim 5, wherein the ball is made of metal.

7. The electrode of claim 1, wherein the gas connection and the opening define a flow path, and wherein the valve body is arranged in the flow path.

8. The electrode of claim 7, wherein an insulating sleeve is arranged in the cavity.

9. The electrode of claim 1, wherein an insulating sleeve is arranged in the cavity.

10. The electrode of claim 9, wherein the insulating sleeve is made of plastic.

11. The electrode of claim 9, wherein the insulating sleeve has an internal cylindrical guide portion.

12. The electrode of claim 11, wherein the insulating sleeve forms a sleeve opening which has a reduced inside diameter compared with the guide portion.

13. The electrode of claim 12, wherein the sleeve opening and the opening in the upper part are arranged coaxially.

14. The electrode of claim 13, wherein the insulating sleeve provides an encircling collar on the inside, which cooperates with the valve body.

15. The electrode of claim 9, wherein the insulating sleeve provides an encircling collar on the inside, which cooperates with the valve body.

16. The electrode of claim 15, wherein the collar has a beveled stop surface.

17. The electrode of claim 9, wherein the valve body is accommodated in the insulating sleeve.

18. The electrode of claim 9, wherein the flow path passes through the insulating sleeve.

19. The electrode of claim 1, wherein a guide element for receiving the bolt is accommodated in the upper part of the electrode.

20. The electrode of claim 19, wherein the guide element is a ceramic sleeve.

21. The electrode of claim 19, wherein the guide element has a cylindrical passage which is aligned with the opening in the upper part and the sleeve opening.

22. The electrode of claim 21, wherein the inside diameter of the passage is smaller than the opening in the upper part.

23. The electrode of claim 22, wherein the guide element is a ceramic sleeve.

24. An electrode for the resistance welding of bolts, comprising:
   an upper part and a lower part, which are configured to be connectable together and, in the connected state, jointly provide a cavity;
   the upper part having an opening for introducing a bolt, and the lower part having a gas connection for a pressurized gas,
   wherein
   a valve body, the opening being at least one of closable directly and closable indirectly by the valve body, is arranged in the cavity.

* * * * *

UNITED STATES PATENT AND TRADEMARK OFFICE
CERTIFICATE OF CORRECTION

| | | |
|---|---|---|
| PATENT NO. | : 10,940,558 B2 | Page 1 of 1 |
| APPLICATION NO. | : 15/996415 | |
| DATED | : March 9, 2021 | |
| INVENTOR(S) | : Fuerderer et al. | |

It is certified that error appears in the above-identified patent and that said Letters Patent is hereby corrected as shown below:

On the Title Page

Item (12) "Fuerderer" should read -- Fuerderer et al. --

ADD:
(72) Inventor: Christian Duempelmann, Wickede, DE(US);

Signed and Sealed this
Twentieth Day of December, 2022

Katherine Kelly Vidal
*Director of the United States Patent and Trademark Office*